United States Patent Office 3,595,667
Patented July 27, 1971

3,595,667
SEAMING OR SEALING SYNTHETIC SAUSAGE CASINGS WITH ISOCYANATE ADHESIVE COMPOSITION
Albin F. Turbak and Henry J. Rose, Danville, Ill., assignors to Tee-Pak, Inc.
No Drawing. Application Nov. 26, 1968, Ser. No. 779,230, which is a continuation-in-part of application Ser. No. 718,343, Apr. 3, 1968. Divided and this application May 1, 1969, Ser. No. 821,067
Int. Cl. A22c 13/00
U.S. Cl. 99—176     7 Claims

ABSTRACT OF THE DISCLOSURE

A novel adhesive for sealing or joining sheets or films of regenerated cellulose or fiber-reinforced regenerated cellulose comprises a mixture of a polymeric polyisocyanate and an activator, such as a polyol or a reaction product of a polyol with ethylene oxide or the like, diluted to a suitable consistency with a volatile inert solvent. The coating composition may be used to seam sheets of regenerated cellulose or paper-reinforced regenerated cellulose into tubular form or in forming cemented end closures on tubes of regenerated cellulose or paper-reinforced regenerated cellulose. The adhesive composition is preferably applied in a very thin film and cured by heating at an elevated temperature, e.g. 300–320° F., for about 20–30 sec., more or less.

CROSS REFERENCE TO RELATED APPLICATION

This application is a division of co-pending application Ser. No. 779,230, now abandoned, filed Nov. 26, 1968, which is a continuation-in-part of co-pending application Ser. No. 718,343, filed Apr. 3, 1968.

BACKGROUND OF THE INVENTION

This invention relates to novel adhesive compositions for joining films of regenerated cellulose or paper-reinforced regenerated cellulose and is particularly useful in forming adhesive seals which have high dry and wet strength.

In the formation of regenerated cellulose or paper-reinforced regenerated cellulose sausage casings by adhesive seaming of flat stock it is necessary to provide an adhesive which will form a seal having high wet and dry strength. In fact, the wet strength of such an adhesive seal must be sufficient to prevent breakage along the seal when the casing is stuffed and immersed in hot water.

The prior art has suggested the use of a variety of adhesives in the formation of tubular fibrous regenerated cellulose casings. These prior art suggestions have never been successful commercially due to a variety of defects. U.S. Pat. 2,952,550 teaches the formation of fibrous casings from paper-reinforced regenerated cellulose sheet material using a variety of cellulose adhesives. Various cellulose esters are used for adhering sheet material into tubular form followed by treatment of the ester to saponify it and regenerate cellulose therefrom. Various acid and alkaline solvents, e.g. concentrated phosphoric acid and benzyl trimethyl ammonium hydroxide, are suggested for use in solubilizing cellulose so that tubes may be seamed and cellulose subsequently regenerated to form tubular casings. Another adhesive treatment involves the softening or solubilizing of cellulose with concentrated zinc chloride solutions to permit the sheet material to be formed into a tube. U.S. Pats. 2,686,128; 2,686,725; 2,773,773; 2,845,357; 2,953,072; 3,007,832; and 3,066,461 disclose a variety of adhesives for use in formation of fibrous casing from paper-reinforced regenerated cellulose sheet material. Most of the adhesives involve soluble cellulose derivatives which are subsequently insolubilized or involve certain resins which exhibit adhesive properties toward regenerated cellulose. The various adhesive compositions which are disclosed in the aforementioned patents are subject to a variety of defects or objections from a commercial standpoint. The adhesives are either expensive and difficult to apply or, in some cases, are toxic and undesirable for use in the preparation of sausage casings, or provide inadequate wet strength. There are many adhesives reported in the literature which provide adequate dry strength for joining cellulosic materials but are completely ineffective under rewet conditions. Accordingly, there has been a considerable need for a suitable adhesive composition for joining cellulosic sheet or film materials which will produce a seam or joint having high dry and wet strength.

STATEMENT OF OBJECTS AND FEATURES

It is an object of this invention to provide a new and improved adhesive composition for joining or adhering cellulosic sheet or film material.

Another object of this invention is to provide a new and improved method for production of sausage casings by adhesive sealing of cellulosic sheet or film material.

Still another object of this invention is to provide novel cellulosic casings having adhesively secured end closures.

A feature of this invention is a new and improved adhesive for cellulosic sheet and film materials which, when fully cured, produces a bond having high dry and wet strength.

Another feature of this invention is the provision of a new and improved adhesive composition for cellulosic sheet or film materials including a polymeric polyisocyanate and an active-hydrogen-containing activator.

Still another feature of this invention is the provision of an improved method for producing a sausage casing (or other tubular food packaging material) by forming a cellulosic sheet or film material into tubular form and joining the same by an adhesive comprising a polymeric polyisocyanate and an active-hydrogen-containing activator.

Still another feature of this invention is the provision of a new and improved sausage casing (or other tubular food packaging material) having an adhesively bonded end closure.

Other objects and features of this invention will become apparent from time to time throughout the specification and claims as hereinafter related.

SUMMARY OF THE INVENTION

In accordance with this invention, it has been discovered that adhesive compositions comprising a polymeric polyisocyanate and an active-hydrogen-containing activator, such as poly glycols, and preferably containing a wetting agent, such as sorbitan ester, are effective to adhere cellulosic or polyvinyl alcohol sheet or film materials to produce adhesive bonds having high dry and wet strength. The adhesive may be used in seaming cellulosic or polyvinyl alcohol sheet materials into tubular form to produce cellulosic polyvinyl alcohol casings having high dry and wet strength. The adhesive is preferably applied in a thin film, of the order of 0.1–0.2 mil, and the product formed into a tube and the adhesive cured by heating to an elevated temperature, e.g. 300–320° F. for a period of 20–30 sec. more or less. The adhesive composition has a good pot life, e.g. 1 to 2 days or more, and may be applied as is or diluted with any suitable inert volatile non-aqueous (anhydrous) solvent.

DESCRIPTION OF THE PREFERRED EMBODIMENTS

Cellulosic sausage casings (or other tubular food packaging materials) may be prepared by forming cellulosic sheet or film material, either clear regenerated cellulose film or paper or other fiber-reinforced regenerated cellulose sheet material, into a tube and adhering the same by application of a novel adhesive composition to form a seam having high dry and wet strength. The adhesive composition is applied along the edge of the sheet or film material in a thin layer, e.g. of the order of 0.1–0.2 mil, and a seam is then formed and the adhesive cured by heating to a temperature of the order of 300–320° F. for about 20–30 sec. The novel adhesive composition may also be used in the formation of adhesively-bonded end closures in cellulosic casings.

The novel adhesive composition utilized in this invention comprises a polymeric polyisocyanate admixed with an activator, such as polyol or an ethoxy or propoxy adduct thereof, and preferably including a suitable surfactant or wetting agent to insure penetration of the adhesive composition into the cellulosic sheet or film. The adhesive composition may, if desired, be diluted to a desired consistency with a suitable volatile inert solvent. The adhesive composition usually contains sufficient activator to react with only part of said polyisocyanate with the resulting excess of isocyanate equivalents in the adhesive composition (i.e., as compared to the equivalents of active-hydrogen functional groups of the activator) thereby being available to react with active-hydrogen-containing constituents within the surface to which the adhesive composition is to be applied. The adhesive composition, after penetration of the surface to be adhered, reacts with the usual water, glycerol, or other active-hydrogen-containing constituents thereof. The adhesive composition is effective to produce a seam joining cellulosic sheet of film materials which has a high dry and wet strength. In fact, the seam produced by this adhesive is strong enough that when it is subjected to a breaking force, after soaking in hot water, the regenerated cellulose will be torn from the paper reinforcement or substrate rather than breaking along the adhesive bond.

Polymeric polyisocyanates used in the adhesive composition include polyether, polyester, and polyurethane polyisocyanates (e.g. Marlon, Mondur, and Polybond isocyanates). These materials are polymeric ethers, urethanes or esters containing a plurality of isocyanate groups or molecule which are generally pendent from the polymeric chain.

Activators (or cross-linking agents) used in the adhesive composition include polyols, and reaction products of polyols with ethylene oxide, propylene oxide, or butylene oxide, e.g. Actol 32–160, polyoxypropylene triol (M.W. above 1000), Actol 31–56, Actol 33–46, and other members of the Actol triol series, polyethylene glycols, polypropylene glycols, polyglycerols, polypentaerythritols, trimethylolpropane, butylene glycol, etc.

Surfactants used in making the adhesive composition wet cellulosic surfaces more effectively include fatty esters of polyols, e.g. Span 20 sorbitan monolaurate, Span 25 sorbitan trilaurate, Span 40 sorbitan monopalmitate, Span 45 sorbitan tripalmitate, Span 60 sorbitan monostearate, Span 65 sorbitan tristearate, Span 80 sorbitan monoleate, and Span 85 sorbitan trioleate, and epoxidized fatty oils, e.g. Admex 710, Paraplex G–62 epoxidized bodied soya bean oil, Epoxol 9–5 epoxidized oil (a polyepoxide monomer) containing at least 9% oxirane oxygen and 5 reactive groups per molecule, Epoxol 7–4 an epoxidized soya bean oil containing at least 7% oxirane oxygen and 4 reactive groups per molecule, Unox Epoxide 101 (3,4-epoxy - 6 - methylcyclohexyl-methyl-3,4-epoxy-6-methyl-cyclohexane-carboxylate).

The polymeric polyisocyanate is usually supplied diluted with about 66 parts of solvent, mixture of inert Cellosolve and xylene, per 100 parts polyisocyanate resin, and is mixed with the activator and wetting agent in solution in a small amount of tetrahydrofuran, e.g. 10–30 parts per 100 parts polyisocyanate resin. When the composition is thus prepared it is quite viscous and may be applied as is or may, if desired, be further diluted using a suitable volatile inert solvent. When the adhesive composition is diluted it is preferred to use an active-hydrogen-free solvent which penetrates or bites into the cellulose film or sheet, e.g. ethers, esters or ketones (free of hydroxy groups) such as methylethyl ketone, acetone, tetrahydrofuran, ethyl acetate, etc.

The preparation of preferred embodiments of the adhesive compositions and the application of those compositions in sealing or seaming cellulosic film or sheet materials is illustrated in the following non-limiting examples. In these examples, parts or percentages are by weight unless otherwise stated.

EXAMPLE 1

An adhesive composition was prepared comprising a polymeric polyisocyanate and a polyol activator. Mondur CB, a polymeric polyisocyanate having a 17.3% NCO content with a solid equivalent weight of 190 and available commercially from Mobay Chemical Company, was used in a solution comprising 100 parts polyisocyanate resin in 41 parts inert Cellosolve and 25 parts xylene. To this solution there was added a solution of 8 parts Actol 32–160 polyoxypropylene triol in 12 parts tetrahydrofuran. The composition was mixed thoroughly and applied as an adhesive in seaming cellulosic sheet and film materials.

The adhesive composition prepared above was applied to the edge of a paper-reinforced regenerated cellulose sheet in a thickness of about 0.1–0.2 mil and allowed to penetrate the surface. The sheet was formed into a tube and the adhesive cured by heating at 300–320° F. for about 20–30 sec. The tubular casing which was thus prepared was soaked in 85° C. water for 30 min. and evaluated for tensile strength. When the casing was broken along the seam it was found that the regenerated cellulose coating on the paper delaminated from the paper substrate before the seam would break.

The adhesive composition was also used in forming end seals on cellulosic casings. A tubular fibrous (hemp fiber paper-reinforced) casing was folded at one end to provide a closure of the type used in forming the bottom of a paper bag. The adhesive composition formulated above was used in sealing the bag closure. The casing with an adhesively sealed bag end closure is used in processing bolognas and other similar large sausages. When the casing is fully stuffed with sausage emulsion the end closure does not break and a sausage product is obtained having a flat end. The adhesively sealed end closure has adequate strength to resist breakage during processing and cooking and does not break even when the sausage is held in a vertical position with the entire weight of the sausage emulsion bearing against the end closure.

EXAMPLE 2

An adhesive composition was prepared comprising a polymeric polyisocyanate and surfactant including epoxy functionality. Mondur CB was used in a solution comprising 100 parts polyisocyanate resin in 41 parts inert Cellosolve and 25 parts xylene. To this solution there was added a solution of 8 parts Admex 710 (epoxidized soya bean oil) and 2 parts Span 85 (sorbitan trioleate) in 20 parts tetrahydrofuran. The composition was mixed thoroughly and applied as an adhesive in seaming cellulosic sheet and film materials.

The adhesive composition prepared above was used in seaming cellulose tubes and casings and in forming bag type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water the break usually occurred by delamination of the regenerated cellulose from the paper substrate rather than along the adhesive bond.

EXAMPLE 3

An adhesive composition was prepared comprising a polyisocyanate, polyol activator, and a wetting agent. Mondur CB was used in solution comprising 100 parts of polyisocyanate resin in 41 parts inert Cellosolve and 25 parts xylene. To this solution there was added a solution of 8 parts Actol 32–160 and 2 parts Span 85 in 20 parts tetrahydrofuran. The composition was mixed thoroughly and applied as an adhesive in seaming cellulosic sheet and film materials and in forming bag type end closures on cellulosic casings.

The adhesive composition prepared above was used in seaming cellulose tubes and casings and in forming bag type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water the break usually occurred by delamination of the regenerated cellulose from the paper substrate rather than along the adhesive bond.

EXAMPLE 4

An adhesive composition was prepared comprising a polymeric polyisocyanate, polyglycol activator, and a wetting agent. Mondur CB was used in solution comprising 100 parts polyisocyanate resin in 41 parts inert Cellosolve and 25 parts xylene. To this solution there was added a solution of 8 parts PPG2025 (polypropylene glycol) and 2 parts Span 85 in 20 parts tetrahydrofuran. The composition was mixed thoroughly and applied as an adhesive in seaming cellulosic sheet and film materials and in forming bag type end closures on cellulosic casings.

The adhesive composition prepared above was used in seaming cellulose tubes and casings and in forming bag type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water the break usually occurred by delamination of the regenerated cellulose from the paper substrate rather than along the adhesive bond.

EXAMPLE 5

An adhesive composition was prepared comprising a polymeric polyisocyanate and a slightly larger proportion of the polyol activator. Mondur CB was used in a solution comprising 100 parts polyisocyanate resin in 41 parts inert Cellosolve and 25 parts xylene. To this solution there was added a solution of 100 parts Actol 32–160 and 2 parts Span 85. The composition was mixed thoroughly and applied as an adhesive in seaming cellulosic sheet and film materials and in forming bag type end closures.

The adhesive composition prepared above was used in seaming cellulose tubes and casings and in forming bag type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water the break usually occurred by delamination of the regenerated cellulose from the paper substrate rather than along the adhesive bond.

EXAMPLE 6

In another experiment, the procedure of Example 1 was repeated substituting Marlon 383 polymeric polyisocyanate (Marlon Company, Broadview, Illinois), for the Mondur CB. Marlon 383 was used in solution at a 76% solids content and contains 14.9% NCO calculated on the solid resin and has a solid equivalent of 220. The composition was otherwise the same as that used in Example 1 and produced an adhesive bond substantially the same as that obtained in Example 1.

EXAMPLE 7

Another adhesive composition was prepared comprising a polymeric polyisocyanate and a more reactive polyol activator. Mondur CB was used in a solution comprising 100 parts polyisocyanate resin in 41 parts inert Cellosolve and 25 parts xylene. To this solution there was added 20 parts trimethylol propane dissolved in tetrahydrofuran. The composition was mixed thoroughly and applied as an adhesive in seaming cellulosic sheet and film materials. The adhesive functions well but has a relatively short pot life. The activator is so reactive that the adhesive must be used within one-half day after preparation.

The adhesive composition prepared above was used in seaming cellulose tubes and casings and in forming bag type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water the break usually occurred by delamination of the regenerated cellulose from the paper substrate rather than along the adhesive bond.

The adhesive compositions described above are useful in treating a considerable variety of cellulosic materials. These adhesives may be used in sealing or adhering regenerated cellulose films, paper or fiber-reinforced regenerated cellulose films or sheets, and other cellulosic materials such as paper and textiles. The adhesive compositions are particularly useful in seaming regenerated cellulose or paper or fiber-reinforced regenerated cellulose films or sheets into tubular casings. The adhesives are useful in forming bag type end seals on cellulosic casings. The adhesives are primarily useful in conjunction with the sealing of cellulosic materials but are also useful in sealing sheets or films of cured and insolublized polyvinyl alcohol or polyvinyl alcohol copolymers or paper or fibrous reinforced sheets or films of polyvinyl alcohol or polyvinyl alcohol copolymers. In the formation of bag type end closures on cellulosic casings the adhesive is useful both with untreated or uncoated casings and casings which have a release coating on their inner surface. The surfactants and solvents used in the preparation of the adhesive compositions and other solvents which may be used in further diluting the adhesive compositions enable the adhesive to penetrate release coatings and adhere to the regenerated cellulose or the paper-reinforced regenerated cellulose substrate.

In the several examples set forth above there are illustrated preferred adhesive compositions. The proportions of the polyisocyanate and activator and wetting agent are not highly critical but are selected to provide the desired function. The polymeric polyisocyanate is preferably used in a solution of about 60% concentration. Higher concentrations of the polymeric polyisocyanate may be used if desired and in some circumstances the adhesive composition may be further diluted to any desired consistency using suitable volatile inert solvents. The activator, which is a polyol of the type described above, is added in an amount sufficient to cross-link the polyisocyanate and cause it to cure across the entire thickness of the adhesive bond. Polyols may be used in proportions ranging from about 1% up to 20% or more based on the weight of polyisocyanate resin. The surfactants or wetting agents used in the composition are preferably used at a concentration of about 1 or 2% although proportions ranging from about 1% to 20%, based on the weight of polyisocyanate resin, may be used in appropriate circumstances.

We claim:

1. A method of preparing a sausage casing which comprises forming a regenerated cellulose, polyvinyl alcohol, fiber-reinforced regenerated cellulose, or fiber-reinforced polyvinyl alcohol film or sheet into a tube or bag, applying to the resultant overlapping material a fluid adhesive composition comprising a low boiling active-hydrogen-free solvent capable of penetrating into said film or sheet and, dissolved in said solvent, a solute comprising a normally solid polymeric polyisocyanate admixed with, from about 1% to about 20% based on the weight of said polyisocyanate of an active-hydrogen-containing activator capable of cross-linking said polyisocyanate, and from about 1% to about 20% based on the weight of said polyisocyanate of a surfactant capable of effecting wetting of regenerated cellulose, or polyvinyl alcohol said adhesive composition containing an excess of isocyanate equivalents over the equivalents of active-hydrogen-containing groups, allowing said adhesive composition to penetrate the surface of said film or sheet, and thereafter heating the resultant tube to effect removal of said adhesive solvent and form an adhesive film bond between said overlapping material of said film or sheet, said film bond containing reaction products formed by a reaction of isocyanate groups of said polyisocyanate and active-hydrogen-containing constitutents within said film or sheet.

2. A method as defined in claim 1 in which the polyisocyanate is a polyurethane polyisocyanate, polyester polyisocyanate or polyether polyisocyanate.

3. A sausage casing produced in accordance with claim 1.

4. A method as defined in claim 1 in which said activator is a polyol or a reaction product of a polyol with ethylene oxide, propylene oxide, or butylene oxide.

5. A method as defined in claim 4 in which said activator is a polyoxypropylene triol, a polypropylene glycol or an epoxidized soya bean oil.

6. A method as defined in claim 1 in which said adhesive composition includes a surfactant comprising a fatty acid ester of a polyol.

7. A method as defined in claim 6 in which said surfactant is a sorbitan trioleate.

References Cited

UNITED STATES PATENTS

| | | | |
|---|---|---|---|
| 2,607,696 | 8/1952 | Kunz | 99—176X |
| 2,686,725 | 8/1954 | Cornwell | 99—176 |
| 2,801,648 | 8/1957 | Anderson | 260—75X |
| 2,894,919 | 7/1959 | Simon | 260—2.5 |
| 3,007,832 | 11/1961 | Milne | 99—176X |
| 3,084,177 | 4/1963 | Hostettler | 260—404.5 |
| 3,463,745 | 8/1969 | Hofrichter | 260—2.5 |
| 2,929,800 | 3/1960 | Hill | 260—77.5 |
| 3,242,108 | 3/1966 | McGary | 260—2.5 |
| 3,473,951 | 10/1969 | De Rossi | 260—75X |
| 3,505,250 | 4/1970 | Saunders | 260—75X |

FOREIGN PATENTS

| | | | |
|---|---|---|---|
| 797,299 | 7/1958 | Great Britain | 260—2.5 |

FRANK W. LUTTER, Primary Examiner

R. HALPER, Assistant Examiner

U.S. Cl. X.R.

260—404.5